(12) United States Patent
Ifergan et al.

(10) Patent No.: US 6,758,561 B1
(45) Date of Patent: Jul. 6, 2004

(54) FLEXIBLE EYEGLASS DEVICE

(76) Inventors: Thierry Ifergan, 20805 NE. 30yh Pl., Aventura, FL (US) 33180; Jean-Pierre Sam, 146 Meridian Boulevard, Kirkland, Ontario (CA), H9H 4B3

( * ) Notice: Subject to any disclaimer, the term of this patent is extended or adjusted under 35 U.S.C. 154(b) by 0 days.

(21) Appl. No.: 09/669,492

(22) Filed: Sep. 25, 2000

Related U.S. Application Data

(60) Provisional application No. 60/155,996, filed on Sep. 24, 1999.

(51) Int. Cl.[7] ................................................ G02C 7/08
(52) U.S. Cl. .............................. 351/57; 351/47; 351/58
(58) Field of Search .............................. 351/47, 48, 57, 351/58, 41, 114, 124, 126

(56) References Cited

U.S. PATENT DOCUMENTS 5,431,506 A * 7/1995 Masunaga .................... 351/41
5,568,207 A * 10/1996 Chao ........................... 351/57
6,139,141 A * 10/2000 Zider ........................... 351/57
6,139,142 A * 10/2000 Zelman ....................... 351/57

FOREIGN PATENT DOCUMENTS

JP            9-138374        * 5/1997        ................... 351/47

* cited by examiner

*Primary Examiner*—Huy Mai

(57) ABSTRACT

An eyeglass device comprised of a primary eyeglass frame and an auxiliary eyeglass frame, each containing lenses therein. The primary eyeglass frame includes a bridge and earpieces, which are connected to extensions on each side of the frame. The bridge may made of a flexible memory alloy, such as NiTi or CuAlBe. The extensions have magnets mounted on the undersides of them. The auxiliary eyeglass frame also includes a bridge and temporal extensions. These extensions have magnets mounted to the tops of them. The magnets engage magnetically with each other to connect the auxiliary eyeglass frame to the primary eyeglass frame. The flexible bridges of the primary and auxiliary eyeglass frames assist in preventing the auxiliary eyeglass frame from becoming dislodged from the primary eyeglass frame in case it jostled by the wearer because they can withstand slight distortion.

11 Claims, 5 Drawing Sheets

FLEXIBLE EYEGLASS DEVICE

CROSS-REFERENCE TO RELATED APPLICATION

Reference is made to provisional application No. 60/155,996 FILED Sep. 24, 1999 from which priority is claimed.

FIELD OF THE INVENTION

The present invention relates to an eyeglass device comprising auxiliary eyeglasses, which are attached to primary eyeglasses by magnetic or mechanical engagement.

BACKGROUND OF THE INVENTION

With eyeglass clips which are attached by means of conventional attachments, the clips may become disengaged by torsion. As the frame is twisted or turned in any axial, radial or other direction, the clips will become dislodged from the primary frame, thus falling off or, at a minimum, becoming out of alignment and perhaps partially disconnected from the primary frame. To address this problem the rigidity of the primary frame must therefore be balanced, so as not to deform too much when subjected to various types of torsion. This has been true of primary frames used in association with both of magnetic and non-magnetic auxiliary frames. Today, frames are commonly manufactured with more flexible materials.

Another alternative has been to have an auxiliary eyeglass frame made out of extremely flexible material. However, auxiliary frame of this type have the disadvantage of being very fragile.

Various types of auxiliary eyeglass frames which contain magnetic material to facilitate adhesion to the primary eyeglass frame have been disclosed in the prior art. U.S. Pat. No. 4,070,103 discloses an eyeglass frame in which the peripheral edges of the primary frame and lens rim covers contain magnetic strips to hold the lens rim cover in place on the primary frame. U.S. Pat. No. 5,416,537 discloses an eyeglass frame which contains magnetic members on the temple of the primary frame which engage a corresponding magnetic member on the temple of the auxiliary frame. U.S. Pat. No. 5,642,177 discloses an auxiliary eyeglass frame which uses the same principle of magnets on the temporal portions as U.S. Pat. No. 5,416,537; however the auxiliary frame disclosed in U.S. Pat. No. 5,642,177 contains a hinge on the bridge of the frame which allows it to be folded. U.S. Pat. No. 5,568,207 discloses an auxiliary frame which contains small extensions on the temporal portions of the frame which secure the auxiliary frame to the primary eyeglass frame in addition to using the principle of magnetic members as disclosed in U.S. Pat. No. 5,416,537. U.S. Pat. No. 6,012,811 discloses an auxiliary eyeglass frame in which the bridge includes a U-shaped structure having two arms on the top and bottom of the bridge, respectively, with magnets located in respective arms, and the bridge of the primary frame, including its magnetic member, is sandwiched between the two arms.

There are many disadvantages to the eyeglasses described above. The auxiliary eyeglass frame described in U.S. Pat. No. 4,070,103 requires magnetic strips on both the primary and auxiliary frames. The auxiliary eyeglass frame described in U.S. Pat. No. 5,416,537 has the magnets attaching at the top of the primary frame, thus requiring the wearer to be extraordinarily precise in placing the auxiliary frame on the primary frame. The auxiliary eyeglass frame disclosed in U.S. Pat. No. 5,642,177 has front mounted magnets, which may cause the auxiliary frame to separate from the primary frame if jostled by the wearer.

Canadian patent 2,235,798, Canadian application 2,258,142, and U.S. Pat. No. 5,894,335 provide other examples of mechanical and/or magnetic attachment of auxiliary and primary frames.

SUMMARY AND OBJECTS OF THE INVENTION

The primary objective of this present invention is to provide an auxiliary eyeglass frame which securely attaches to a primary eyeglass frame by magnets.

This objective is achieved by a primary and auxiliary eyeglass frame combination comprised of a auxiliary eyeglass frame and a primary eyeglass frame, each containing separate lenses therein. The auxiliary eyeglass frame includes two side portions which are connected by a bridge. Each side portion of the frame has a temporal extension with magnets mounted, preferably, on a top of each extension. The primary eyeglass frame also includes two side portions which are connected by a bridge. The bridges of both the primary and auxiliary frames may be made of a flexible memory alloy, such as NiTi, or CuAlBe similar to that disclosed in U.S. Pat. No. 5,640,217, so that the bridges are more deformable than other parts of the frames. Each side portion has a temporal extension to which temporal members, providing ear pieces, are connected. Each temporal extension also has a magnet mounted, preferably, on an underside of the extension. The auxiliary eyeglass frame is secured to the primary eyeglass frame by the magnetic force between the bottom mounted magnets on the primary frame's temporal extensions and the top mounted magnets on the auxiliary frame's temporal extensions. If the bridge of either the primary or auxiliary frame is made of a flexible shape memory alloy, such as NiTi or CuAlBe, it would be less likely that the auxiliary frame will become dislodged if jostled by the wearer because both frames would be able to withstand slight deformation. In other words, a relatively flexible portion linking two more rigid frame parts could deform to absorb an impact on one frame part, preventing the shock being transmitted to the other frame part.

According to another aspect of the invention, magnets may be mounted on one or both frames at any suitable location, such as on one or both bridges, for example, and one or more other, possibly adjacent, locations of one or both frames (where a magnet is not mounted, for example, the temporal extensions or temples), may be made of a flexible shape memory alloy or other suitable flexible material.

Magnetic engagement of primary and auxiliary frame parts may be obtained by provision of cooperating permanent magnets on both frame parts, or by a permanent magnet on only one frame part with a cooperating portion of the other frame part being made of magnetic material functioning as a temporary magnet.

The primary and auxiliary frames may rely for attachment together on magnetic engagement alone, or such magnetic engagement may be supplemented or replaced by mechanical engagement provided, for example, by suitably located clips, pins and sockets or other suitable releasable fastenings, as described in any of the references referred to above, the disclosures of which are incorporated herein by reference.

The various features of novelty which characterize the invention are pointed out with particularity in the claims annexed to and forming a part of this disclosure. For a better

DETAILED DESCRIPTION OF THE PREFERRED EMBODIMENTS

Figure 6:
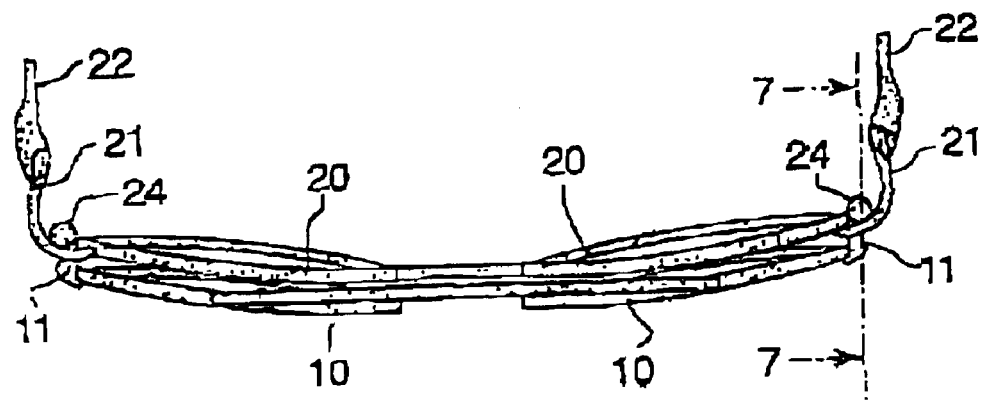
FIG. 6 is a top view of the primary and auxiliary frame combination with nosepieces omitted.

Referring to the drawings, and in particular FIGS. 1–4, a primary and auxiliary frame combination in accordance with the present invention is comprised of a auxiliary eyeglass frame 10 containing a first set of lenses therein and an primary eyeglass frame 20 containing a second set of lenses therein. The auxiliary eyeglass frame 10 includes a bridge 13 and temporal extension 11 on each side. Each temporal extension 11 contains a magnet 12 mounted at a top of the extension 11 in an upwardly protruding through-socket 16 formed at a free end of the extension 11, as shown in FIG. 6. The primary eyeglass frame 20 includes two side portions each having a temporal region with temporal extension 21 to which the temporal members 22, for engaging a wearer's head or ears, are pivotally connected. The primary eyeglass frame 21 also includes a bridge 25. Each temporal extension 21 contains a magnet 24 mounted to the bottom of the extension 21 in a through-socket 23. The bridges 25 and 13 of the primary frame and the auxiliary frame, respectively, are made of a flexible shape memory alloy, such as NiTi or CuAlBe, providing a relatively flexible or deformable link.

Figure 1:
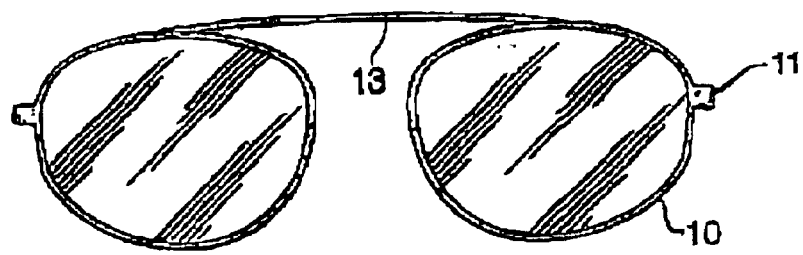
FIG. 1 is a front of the auxiliary eyeglass frame of the present invention.
Figure 2:
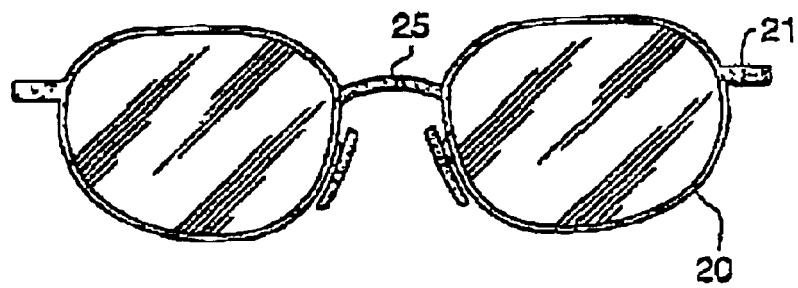
FIG. 2 is a front view of a pair of primary eyeglass frames.
Figure 3:
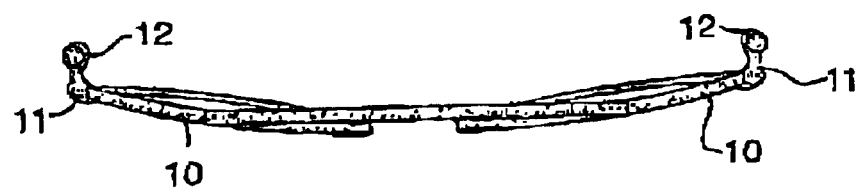
FIG. 3 is a top view of the auxiliary eyeglass frame.
Figure 4:
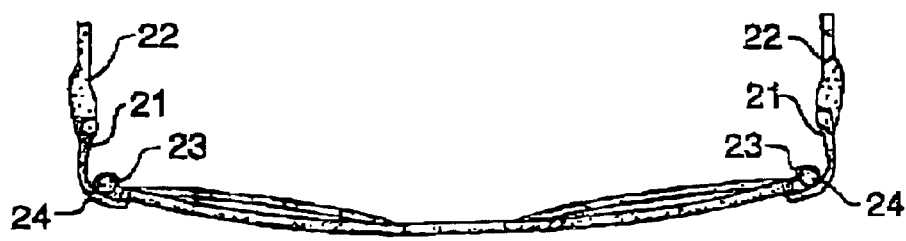
FIG. 4 is a top view of the primary frame with nosepieces omitted.
Figure 5:
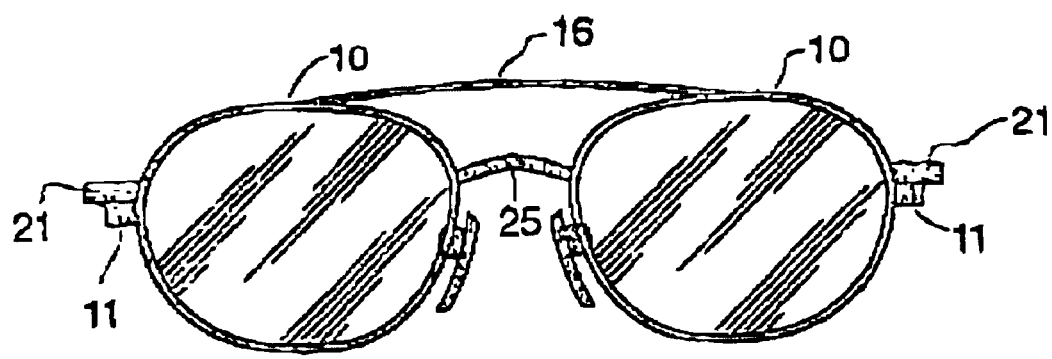
FIG. 5 is a front view of the primary and auxiliary frame combination.

As seen in FIGS. 5 and 6, the auxiliary eyeglass frame 10 is secured in front of the primary eyeglass frame 20 by the magnetic force between magnets 12 and 24. As a result, the auxiliary eyeglass frame 10 is securely mounted from the underside with the second temporal extensions underneath respective first temporal extensions and will not easily be disengaged from the primary eyeglass frame 20. It should be noted that magnets 12 and 24 are not embedded in the temporal extensions 11 and 21. Thus, the temporal extensions are not hollow and are less likely to break.

Figure 7:
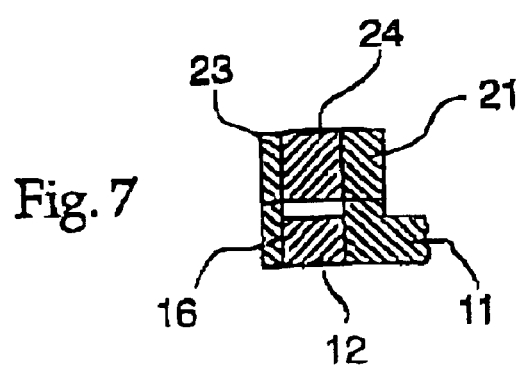
FIG. 7 is a cross sectional view taken along lines 7—7 of FIG. 6 showing the positioning of the magnetic attachment between the primary and auxiliary frames.

FIG. 7 shows the magnetic engagement between the magnets 12 and 24. The temporal extensions are in contact with each other and there is a slight gap between the magnets 12 and 24 with magnet 12 aligned underneath magnet 24. Magnet 12 is slightly recessed into the through-socket socket 15 of the temporal extension 11, while magnet 24 is mounted flush to the temporal extension. In an alternative embodiment, magnet 12 may be mounted flush to the top of the through-socket 15 of the temporal extension 11 and magnet 24, whilst mounted to the bottom of the temporal extension 21 may be slightly recessed into the through-socket 26 of the temporal extension 21. Thus, the magnets do not come directly into contact with one another, but are close enough to still be attracted. The advantage of not having the magnets come into direct contact is that it prevents them from becoming damaged.

Figure 8:
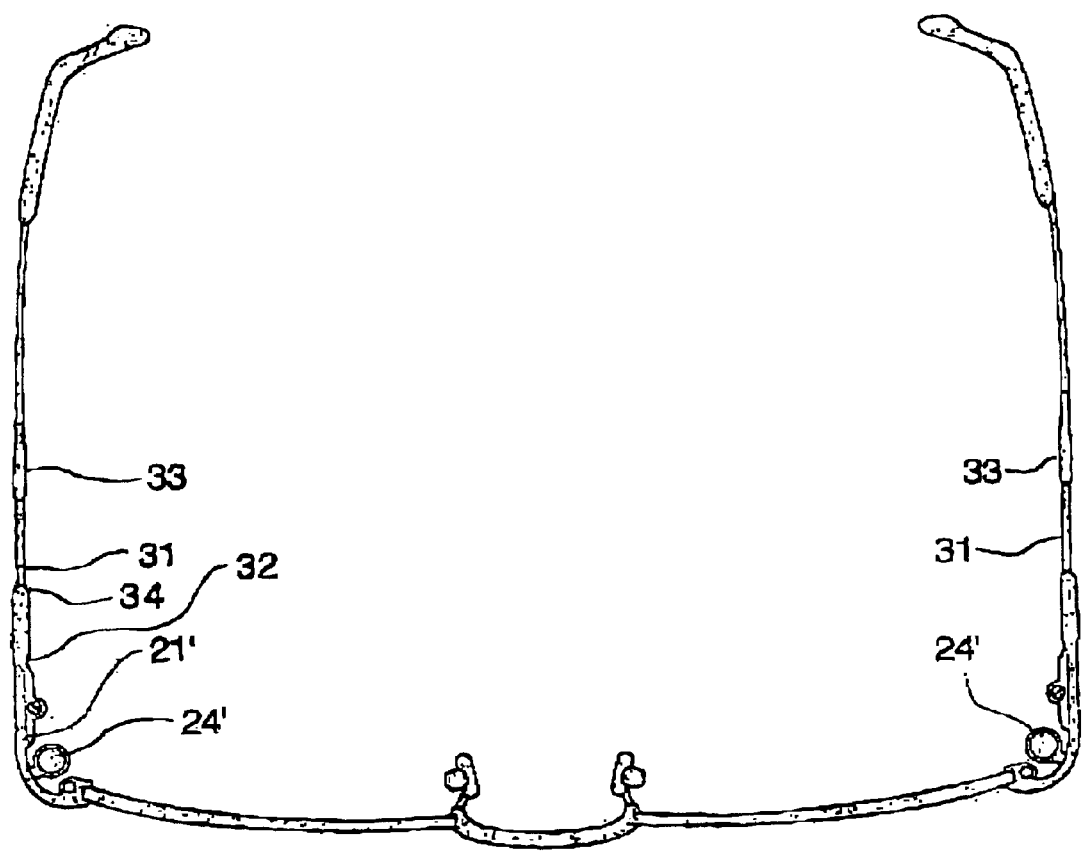
FIG. 8 is a top view of a primary eyeglass frame according to a second embodiment wherein a portion of each temple member extending for only part of the temporal region is formed from flexible shape memory alloy to provide a relatively flexible link.

In the second embodiment shown in FIG. 8, each temple member 22' has a linking portion 31 which is formed from flexible shape memory alloy and extends rearward from a hinge portion 32 for only part of the temporal region, providing a relatively flexible link. Each stem portion 31 is connected to a rearward portion of the temple member and to the hinge portion 32 by receipt and bonding by adhesive or solder in sockets 33 and 34 formed in the rearward portion of the temple member and in the hinge portion, respectively. Permanent magnets 24' (or suitable mechanical fasteners) are mounted on the temporal extensions 21'.

Figure 9:
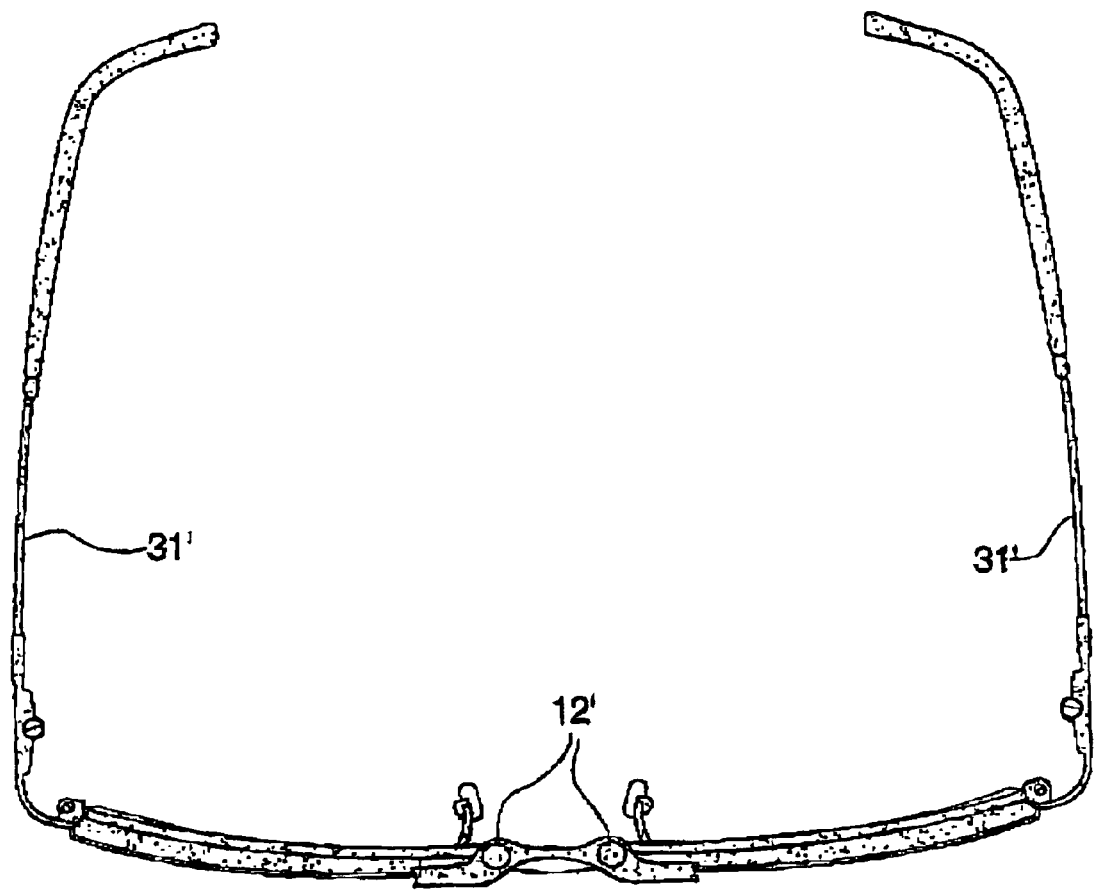
FIG. 9 is a top view of a primary and auxiliary eyeglass frame combination according to another embodiment of the invention wherein a portion of the temple members formed from flexible shape memory alloy extends for substantially the entire the temporal region.
Figure 10:
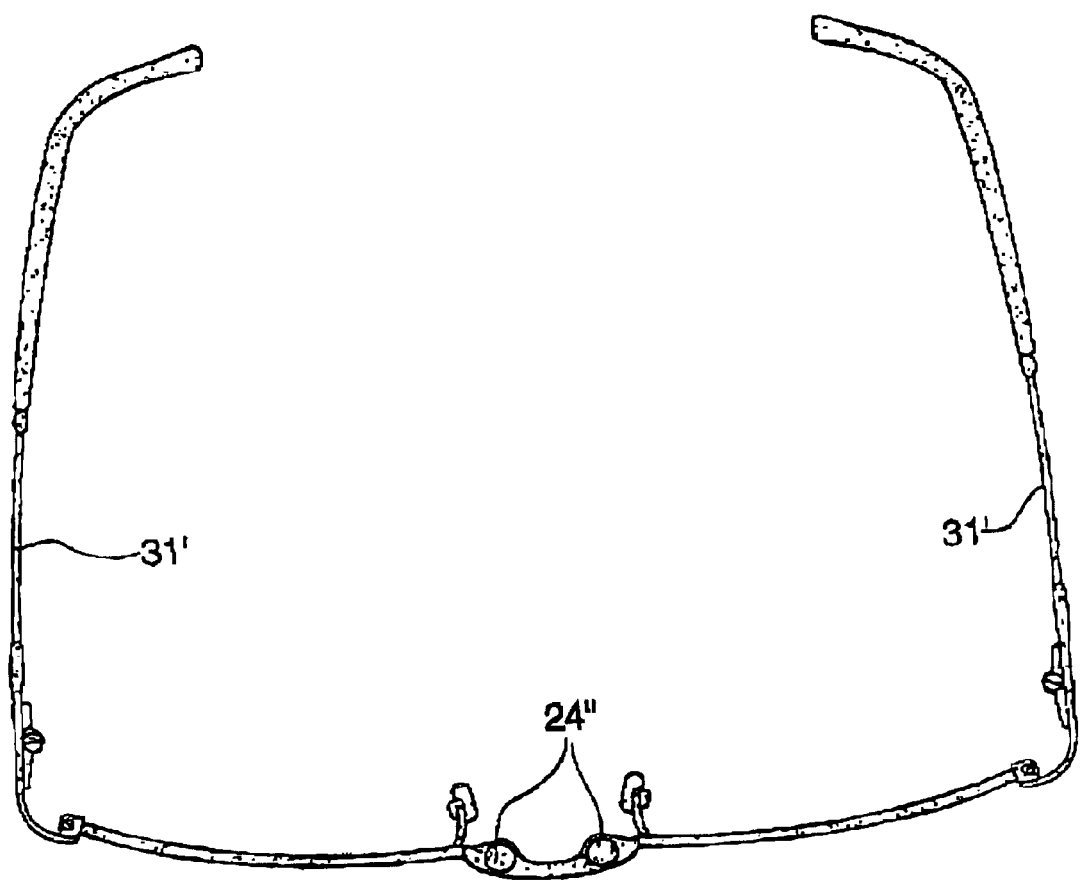
FIG. 10 is a top view of the primary frame of the embodiment shown in FIG. 9.

In the embodiment of FIGS. 8 and 9, a portion 31' of each temple members 22' formed from flexible shape memory alloy extends for substantially the entire temporal region. Permanent magnets 24" and 12" are mounted on the bridge portions of both the primary and auxiliary frames.

While specific embodiments of the invention have been shown and described in detail to illustrate the application of the principles of the invention, it will be understood that the invention may be embodied otherwise without departing from such principles.

What is claimed is:

1. An eyeglass device comprising:

two temporal members, a primary eyeglass frame having means for holding a first set of lenses therein, said primary eyeglass frame including a first bridge, two first side portions, each having a first temporal extension for connecting to a temporal member for retaining the primary frame on a user, each said first temporal extension including a first magnet attached thereto, an auxiliary eyeglass frame having means for holding a second set of lenses therein, said auxiliary eyeglass frame including a second bridge, two second side portions, each having a second temporal extension, each said second temporal extension including a second magnet attached thereto, wherein the first magnets attached to respective ones of the first temporal extensions magnetically engage respective second magnets attached to respective ones of said second temporal extension in overlying relation so as to secure said auxiliary eyeglass frame to said primary eyeglass frame and wherein at least a portion of said temporal members and at least one of said first bridge and said second bridge is comprised of a flexible shape memory alloy.

2. An eyeglass device according to claim 1 wherein said flexible shape memory alloy is one of NiTi and CuAlBe.

3. An eyeglass device comprising:

a primary eyeglass frame having means for holding a first set of lenses therein and including two first side portions each having a first temporal extension for connecting to a temporal member, each said first side portion carrying a first magnet, an auxiliary eyeglass frame having means for holding a second set of lenses therein and two second side portions, each having a second temporal extension carrying a second magnet, wherein the first magnets carried by respective first side portions magnetically engage respective second magnets carried by respective second temporal extensions with the second temporal extensions extending uaderneath respective first temporal extensions, securing said auxiliary eyeglass frame to said primary eyeglass frame with the second set of lenses aligned with the first set of lenses and wherein said primary eyeglass frame includes a first bridge comprised of a flexible shape memory alloy, and said auxiliary eyeglass frame includes a second bridge comprised of a flexible shape memory alloy.

4. An eyeglass device according to claim 3 wherein said flexible shape memory alloy of said first bridge is one of NiTi and CuAlBe, and said flexible shape memory alloy of said second bridge is one of NiTi and CuAlBe.

5. An eyeglass device according to claim 3 wherein respective second magnets are underneath respective first magnets.

6. An eyeglass device comprising:

a primary eyeglass frame having means for holding a primary set of lenses, and temporal members connected at spaced locations to said primary frame, and operable to retain said primary frame on a user;

an auxiliary eyeglass frame having means for holding an auxiliary set of lenses therein and adapted to be positioned in front of said primary lenses, at least one portion of the auxiliary eyeglass frame and at least one portion of the primary eyeglass frame having a magnetic connection to secure said frames to one another and to inhibit relative movement between the frames, at least a portion of said temporal members of said primary eyeglass frame being comprised of a shape memory alloy.

7. An eyeglass device according to claim 6 wherein said wherein said flexible shape memory alloy is one of NiTi and CuAlBe.

8. An eyeglass device according to claim 6 wherein the magnetic means on said auxiliary frame engages under magnetic means on the primary frame.

9. An eyeglass device according to claim 6 wherein said at least one portion of said primary eyeglass frame and said at least one portion of said auxiliary eyeglass frame having a magnetic connection are in respective temporal regions.

10. An eyeglass device according to claim 6 wherein said at least one portion of said primary eyeglass frame and said at least one portion of said auxiliary eyeglass frame having a magnetic connection are bridges of respective frames.

11. An eyeglass device according to claim 6 wherein at least one portion of one of said primary eyeglass frame said auxiliary eyeglass frame is formed from a shape memory alloy.

* * * * *

UNITED STATES PATENT AND TRADEMARK OFFICE
CERTIFICATE OF CORRECTION

PATENT NO. : 6,758,561 B1
DATED : July 6, 2004
INVENTOR(S) : Ifergan, Thierry and Sam, Jean-Pierre It is certified that error appears in the above-identified patent and that said Letters Patent is hereby corrected as shown below:

Column 5,
Lines 11 and 12, "uaderneath" should read -- underneath --;

Column 6,
Line 11, delete "wherein said"
Line 27, after "eyeglass frame", insert -- and --.

Signed and Sealed this

Twenty-fourth Day of May, 2005

JON W. DUDAS
*Director of the United States Patent and Trademark Office*